United States Patent [19]
Minks

[11] 3,755,685
[45] Aug. 28, 1973

[54] SIMULATED RMS CONVERTER AND VOLTAGE REGULATOR
[76] Inventor: Floyd M. Minks, Rt. 1, Box 66, Kissimmee, Fla. 32741
[22] Filed: Feb. 9, 1972
[21] Appl. No.: 224,714

[52] U.S. Cl............................ 307/9, 322/28, 322/91
[51] Int. Cl................................................. B60l 1/00
[58] Field of Search ...................... 322/91, 28; 307/9

[56] References Cited
UNITED STATES PATENTS
3,530,366  9/1970  Schwarm ........................ 322/91 X
3,456,182  8/1969  Cummins et al.................. 322/91 X
3,660,752  5/1972  Pfeffer ............................... 322/91

Primary Examiner—J. V. Truhe
Assistant Examiner—M. Ginsburg
Attorney—Rines and Rines

[57] ABSTRACT

This disclosure deals with a simulated approximate root-mean-square control regulator system using a network comprising a rectifying circuit, preferably of the voltage doubler type adjusted and poled to produce a converted output approximately following rms value variations of the voltage source and for controlling the output thereof when such approximate rms voltage value exceeds a predetermined value.

8 Claims, 1 Drawing Figure

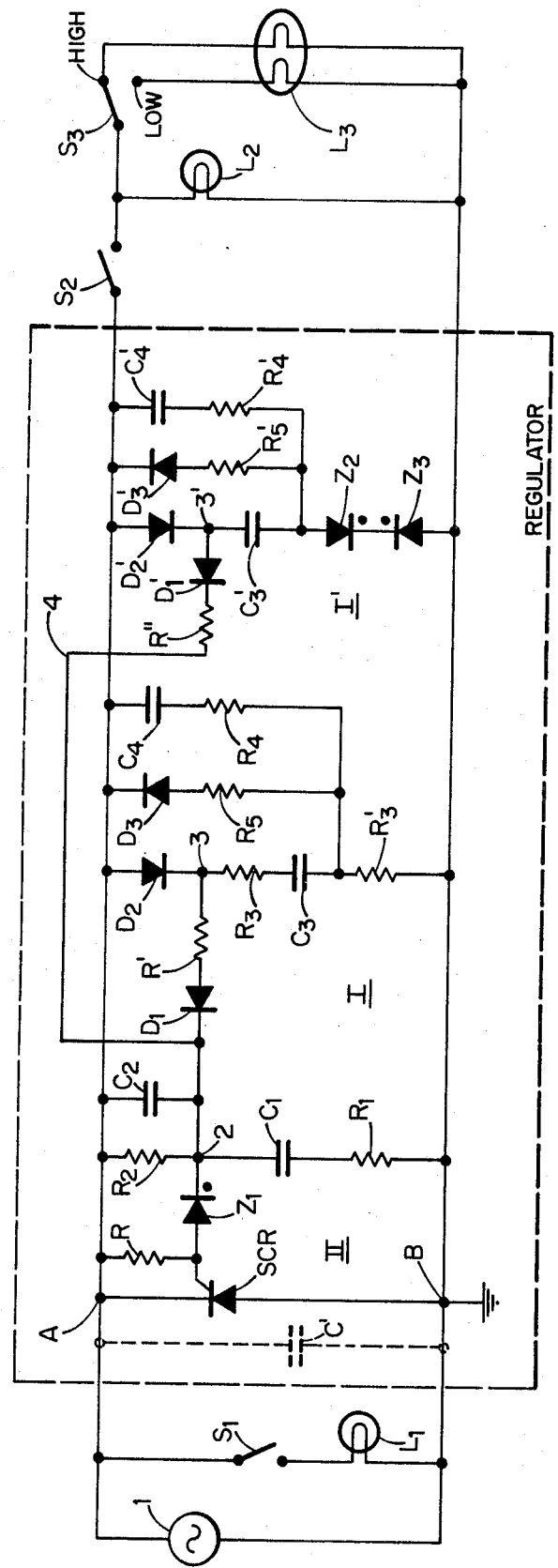

SIMULATED RMS CONVERTER AND VOLTAGE REGULATOR

The present invention relates to voltage regulators as for lighting systems and the like, being more particularly concerned with such systems embodying root-mean-square converters for controlling the root-mean-square voltage applied to the system from an alternator, such as may be employed on vehicles, or other sources of variable frequency voltage.

It has previously been proposed to measure the root-mean-square voltage produced by a fixed frequency sinewave source and to control the value of the root-mean-square (rms) voltage applied to the system in response to this measurement, so as to prevent exceeding a predetermined level of such voltage. In light regulator systems, for example, such control has been generally effected with the aid of series regulating devices, including switches that interrupt the feed of the voltage from the alternator to the load when the rms value thereof exceeds such a predetermined level, thus to effect the required regulation. Such systems, however, are inapplicable in cases where there is a wide variation in frequency of the supplied alternating-current voltage or in the waveform or load characteristics. These variations, moreover, notably occur in such applications as in the lighting systems of vehicles, wherein the alternating-current voltage is supplied from an alternator subject to wide variations in speed of operation and thus in frequency and in the waveform characteristics resulting from wide changes in speed of the vehicle engine. These effects are particularly serious in connection with permanent magnet alternators such as those employed in snow mobiles and in marine applications and the like.

One solution to the problem in connection with such applications has been that described in my co-pending applications Ser. Nos. 817,787, filed Apr. 21, 1969 for "Power Supply Regulator", now abandoned, and 184,080, filed Sept 27, 1971 for "Vehicular Lighting System Regulator and the Like," wherein a power-sensitive impedance element, such as a filamentary lamp or the like, is employed to produce an impedance variation in response to rms voltage variation that can effect the control of the rms voltage applied from the alternator to the lighting system by triggering a shunt regulating switching device, effectively to short-circuit the alternator for a part of the cycle when the rms voltage, as indicated by the lamp characteristics, would otherwise exceed the desired predetermined rms level for optimum overall performance of the lighting system.

While such systems have been found to work admirably well in practice, there are certain circumstances and environments, as where excessive vibration may be produced, where it is undesirable to employ filamentary lamp or similar devices that may be vibration sensitive.

An object of the present invention, accordingly, is to provide a new and improved simulated approximate rms converter system particularly, though not exclusively, adapted for such lighting systems and the like, and which need not employ vibration-sensitive devices, but, to the contrary, enables the control of approximately the rms voltage or rms voltage trend from the alternator or other source of widely varying frequency, waveform and/or load.

In connection with rms variations in vehicular lighting systems, such as snow mobiles and the like, the requirements upon the light regulator circuit for rms voltage control actually need apply only to certain discreet conditions or loading levels, attainable by a combination of the lamps involved in the system. As an example, the voltage level with all lights off need not be accurately controlled, provided damage to the regulator components does not occur. The voltage with the brake light only connected to the alternator must, however, be controlled to give acceptable brilliance and life time to the brake light. The voltage for head lights and tail lights must also be controlled quite accurately over the operating speed range of the vehicle. Voltage level with the operation of the tail light only, is of lesser importance. Other loading conditions not mentioned herein become important only if lamps are changed, as where an improperly rated lamp is substituted in the system.

The regulation requirements for frequency or waveform variation are of considerable concern at the higher speeds, say about 3000 rpm, for example, in snow mobiles. Undesirable reduced lighting effects occur, furthermore, where the peak or average voltage of the waveform is clipped at a certain level, such as has been attempted commercially with high power zener diodes. This gives even worse lighting in the low speed range where these vehicles have, at best, marginal lift. Typical snow mobile engines operate, indeed, from 1500 to 7000 rpm. The permanent magnet alternator generally used approximates a current source; but overall system tolerances make it impractical to energize lights directly without a regulator, even without the use of brake lights. Since the alternator is a current source, if only a brake light were connected to the system when operating at high speed, a burn out in a few seconds or less would occur. Separate windings for brake lights have been proposed, but these are expensive and detract from the overall wattage normally available for the headlight system. With a regulator, however, these windings can generally be paralleled, improving overall system performance.

Waveforms at low speed (15 rpm, idling), where no regulation is desirable, are substantially symmetrically positive and negative and have relatively high peak values compared to the average that would be produced with a pure sinewave. Under the high-speed brake light only condition (4–7 rpm), the positive voltage would need to be reduced essentially to zero, with the resulting phase shift extending to more than the normal 180 electrical degrees. Thus the negative portion of the cycle would be of a short duration and high amplitude. The terms "positive" and "negative" are used herein to refer to the direction of controlled conduction and blocking, respectively, of, for example, a shunt control element, such as an SCR or other switching device, and not necessarily the instantaneous polarity with respect to ground.

While the present invention is preferred for use with shunt-connected switching rectifier devices or the like, it is also advantageous with series-connected regulating devices as will hereinafter be evident. It is, indeed, the characteristic of the alternator or other voltage source and the switching control elements themselves that primarily dictate whether series or shunt regulation will be employed, though at present SCR devices and vehicular permanent magnet alternators seem most practically combined with the shunt configuration of regulator.

A further object of the invention, accordingly, is to provide and novel approximate or simulated root-mean-square controlling regulator for such systems that can be operated over such wide ranges of frequency, amplitude and waveform variation.

Other and further objects will be explained hereinafter and are more particularly delineate in the appended claims. In summary, however, from one of its broader aspects, the invention contemplates a simulated approximate root-mean-square control regulator system having, in combination, a source of alternating polarity voltage the waveform, peak and average voltage, and frequency of which vary over a predetermined range; normally ineffective control switching means connected in circuit with said source and adapted when triggered to conduct in one polarity direction and thus modify the corresponding polarity waveform from said source; a network system connected to said source and having an output connected with said switching means to trigger the same when the approximate root-mean-sqaure voltage of the voltage from said source exceeds a predetermined value, said network comprising a rectifying circuit adjusted to respond to variations in voltage waveform, peak and average voltage and frequency from said source and poled to produce a converted output of polarity opposite to said one polarity and approximately following the root-mean-square value variations of the source voltage, and the network being adjusted to produce from said opposite polarity converted output thereof a trigger voltage for triggering said switching means when the root-mean-square voltage value exceeds said predetermined value.

The invention will now be described with reference to the accompanying drawing, the single FIGURE of which is a schematic circuit diagram illustrating the invention in a preferred form as applied to such vehicular lighting systems.

Referring to the drawing, a vehicular permanent magnet alternator is schematically shown at 1, connected with a lighting system comprising a brake light $L_1$, illuminable upon the depressing of the brake switch $S_1$, a tail light $L_2$ illuminable upon the closing of the light switch $S_2$, and a head light structure illustrated in the form of a dual lamp $L_3$, controlled by the high-low switch $S_3$. Connected in shunt with the alternator 1 between terminal A and preferably ground or chassis terminal B, is the light regulator circuit of the invention, shown comprising a pair of simulating or approximating rms converter network circuits generally designated at I and I', and a control switching circuit generally designated at II. The switching circuit II comprises an SCR element, so labelled, the anode of which is connected to the terminal B, and the cathode of which, to the terminal A with the trigger or gate electrode connected to the rms converter circuits I and I', as hereinafter explained. While certain circuit elements are illustrated, in some applications certain of these elements may, if desired, be omitted, though they are preferred for the complete operational functions to be described. The trigger or gate electrode is returned to the terminal A through a resistor R, and is connected through a zener diode or other reference device $Z_1$ to the terminal 2 of series connection of a resistance-capacitance time constant network comprising capacitor $C_1$ and resistor $R_1$ and a shunt time constant network comprising resistor $R_2$ and capacitor $C_2$, these networks being connected together across the anode and cathode of the switching element SCR. The intermediate terminal 2 is connected through a diode $D_1$ and a resistor R' to the intermediate terminal 3 between a further diode $D_2$ returned to the terminal A, and an additional network comprising resistor $R_3$, capacitor $C_3$ and further resistor $R_3'$ connecting to the terminal B. Shunting the combination of diode $D_2$, resistor $R_3$ and capacitor $C_3$, is (1) a reversely poled diode $D_3$ and a series resistor $R_5$, and (2) a further shunt-connected capacitor $C_4$ and resistor $R_4$. These last-named elements comprise the simulated rms converter circuits I, the operation of which will later be described.

If desired, and as illustrate conduct in one polarity direction and thus modify the corresponding polarity waveform from said source; a network system connected to said source and having an output connected with said switching means to trigger the same when the approximate root-mean-square voltage of the voltage from said source exceeds a predetermined value, said network system comprising means including a rectifying circuit for responding to variations in voltage waveform, peak and average voltage and frequency from said source and poled to produce a converted output of polarity opposite to said one polarity and approximately following the root-mean square value variations of the source voltage, and the network system having means for producing from said opposite polarity converted output thereof a trigger voltage for triggering said switching means when the root-mean-square voltage value exceeds said predetermined value.

2. A simulated approximate root-mean-square control regulator system as claimed in claim 1 and in which said source comprises a vehicular alternator and said source and network system are connected to a vehicular lighting system the normal operating voltage characteristics of which require that the voltage from said source not substantially exceed said predetermined root-mean-square voltage value over said range.

3. A simulated approximate root-mean-square control regulator system as claimed in claim 2 and in which said switching means comprises a shunt-connected switching rectifier.

4. A simulated approximate root-mean-square control regulator system as claimed in claim 2 and in which said network system comprises a voltage doubler circuit.

5. A simulated approximate root-mean-square control regulator system as claimed in claim 2 and in which said network system comprises a shunt branch having a series-connected capacitor and rectifier, with a further rectifier connected in series with the point of series connection and to said switching means.

6. A simulated approximate root-mean-square control regulator system as claimed in claim 5 and in which said shunt branch is provided with means for controlling the voltage level of the opposite polarity output.

7. A simulated approximate root-mean-square control regulator system as claimed in claim 2 and in which said network system comprises a pair of parallel-connected networks each adjusted to produce corresponding converted outputs for different ranges of source voltage waveforms and frequencies within said predetermined range.

8. A simulated approximate root-mean-square control regulator system as claimed in claim 7 and in which said pair of networks comprise voltage doubler circuits.

* * * * *